UNITED STATES PATENT OFFICE.

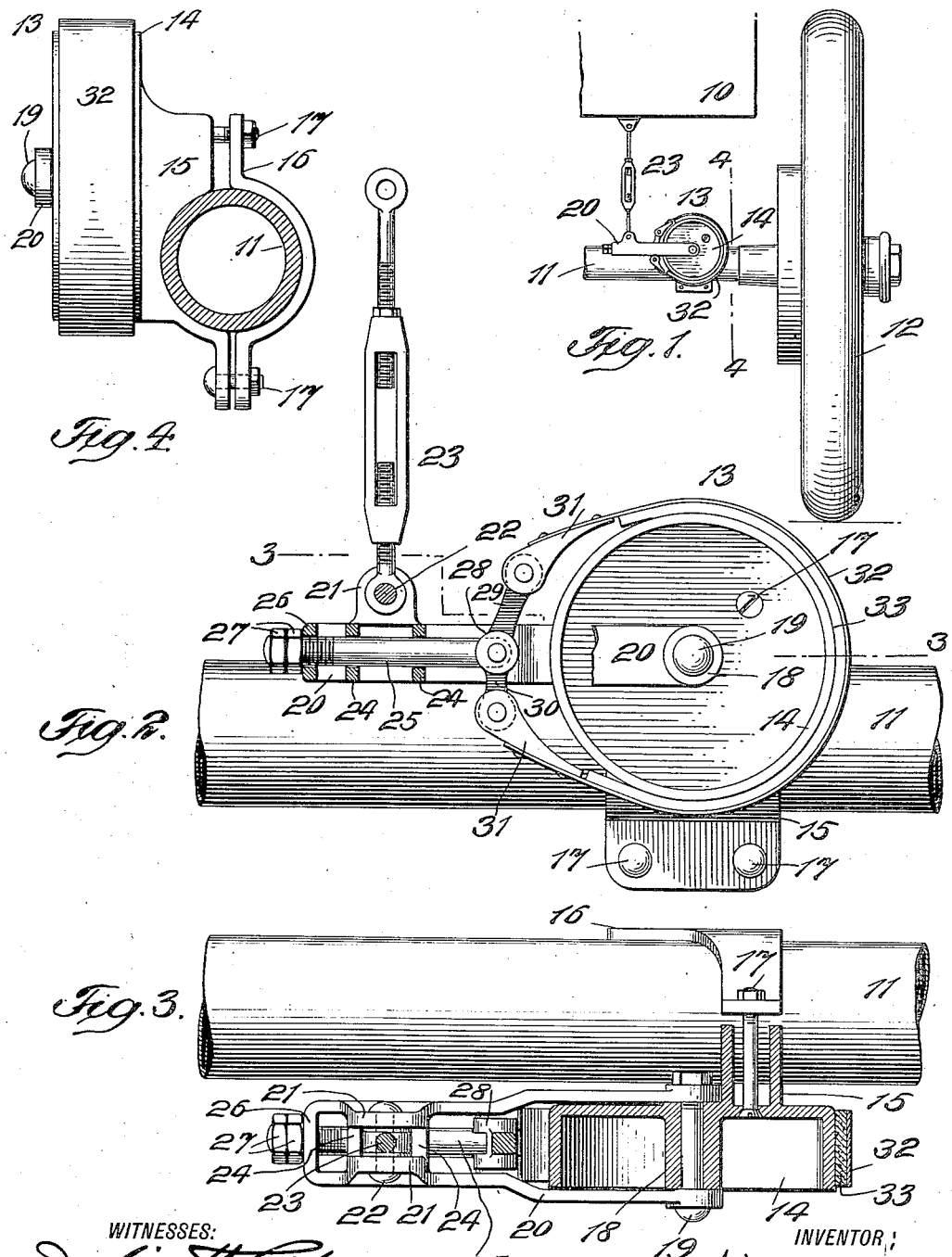

WILLIAM BARDSLEY, OF KEARNEY, NEW JERSEY.

SHOCK-ABSORBER FOR MOTOR AND OTHER VEHICLES.

1,195,959.  Specification of Letters Patent.  Patented Aug. 29, 1916.

Application filed June 19, 1915. Serial No. 34,983.

*To all whom it may concern:*

Be it known that I, WILLIAM BARDSLEY, a citizen of the United States, and a resident of Kearney, in the county of Hudson and State of New Jersey, have invented certain new and useful Improvements in Shock-Absorbers for Motor and other Vehicles, of which the following is a specification.

The invention relates to improvements in shock absorbers of the character adapted for use on motor vehicles and the like to relieve the jolting commonly caused in the vehicle body during travel over rough road beds.

The object of the invention is to provide durable and entirely efficient means interposed between the axle or other lower rigid part and the body portion of an automobile and the like to obviate undue jolting of the body of the vehicle and to reduce strain on the vehicle parts during the travel of the vehicle over uneven surfaces.

The shock absorber of my invention comprises a drum to be secured to the axle or other lower rigid part of the vehicle, a brake band thereon having a double-ended lever connecting its ends with one arm of the lever shorter than the other arm thereof, a crank arm pivoted to said drum and having pivotally connected with it said double-ended lever, and means, such as an adjustable connecting rod, connecting said crank arm, which normally stands in a horizontal position, with the chassis or body portion of the vehicle.

An important feature of my invention is that when a wheel of the vehicle passes over an obstruction in the road or enters a depression in the road bed whereby the body of the vehicle is caused to have a sudden movement downwardly against the usual springs, the brake band with the aforesaid crank arm and connecting rod may turn downwardly with more or less freedom, according to the adjustment of the shock absorber, without undue interference with the natural yielding action of the supporting springs, but that said brake band will be tightened on said drum during the recoil of said springs and check the action thereof, with the result of relieving the shock from the body of the vehicle and saving the springs against possible breakage. The brake band of my invention has a differential action, turning with more or less freedom on the drum according as may be desired, when the vehicle body descends and closely binding against said drum on the ascent of the vehicle body, the degree of the binding action of the band against the drum being subject to regulation in accordance with the size of the car, the character of the supporting springs for the body thereof, and other conditions.

The invention will be fully understood from the detailed description hereinafter presented, reference being had to the accompanying drawings, in which:

Figure 1 is a view of a portion of the rear end of an automobile showing one of the shock absorbers of my invention applied to the rear axle thereof and connected with the body of the vehicle; Fig. 2 is a corresponding view on a larger scale, partly broken away and partly in section, of the same, the vehicle wheel and chassis or vehicle body being omitted; Fig. 3 is a horizontal section through the same taken on the dotted line 3—3 of Fig. 2, and Fig. 4 is a vertical section through the same taken on the dotted line 4—4 of Fig. 1 and being on a larger scale than Fig. 1.

In the drawings 10 designates a portion of the chassis frame or body of the vehicle, 11 one of the usual axles, 12 one of the usual wheels of the vehicle, and 13 the shock absorber, as a whole, connected with the axle 11 and the body 10, the whole being shown somewhat diagrammatically in Fig. 1. The body 10, axle 11 and wheel 12 are of the ordinary commercial type, and in this instance I have shown my shock absorber as applied to a rear axle, although it will be understood that ordinarily four shock absorbers will be employed, two for the front axle and two for the rear axle, although in some types of cars, such as the Ford car, two shock absorbers may be employed at the rear of the car and one at the middle of the front of the car. The shock absorbers will all correspond with one another, and hence the description of the action of one of the shock absorbers will serve as a description for all of them.

The shock absorber of my invention comprises a drum 14 having a plain peripheral surface and, in the present instance, formed with members 15 adapted to fit against one side of the axle 11 and to coact with a clamping member 16 and bolts 17 for securing said drum in rigid position to said axle. The members 15 and clamping member 16 are not in themselves of special importance since they will vary in outline in accordance with the part of the car to which the shock absorber may finally be applied in accordance with the type and general construction of such car. At present said members 15, 16 are somewhat semi-circular in outline because they are intended for application to an axle of cylindrical shape. The drum 14 is hollow and of cup-shape and has a central tubular hub 18 serving as a bearing for a pin or bolt 19 upon which are pivotally mounted the inner end of a bifurcated crank frame or crank arm 20, which arm or frame is formed with integral ears 21 between which is pivotally mounted on a pin or bolt 22 the lower end of a connecting rod 23, whose upper end is pivotally connected with the chassis or body 10. The connecting rod 23 will preferably be formed of two threaded sections and a turn-buckle section, as shown, so that said rod may be rendered adjustable in length in order to meet the conditions that may be met in applying a shock absorber to a vehicle. The crank arm or frame 20 straddles the drum 14 and normally extends in a horizontal position, as shown, with the connecting rod 23 in a vertical position. I preferably form the frame or crank arm 20 of a casting, and near the outer end of this casting the two sides thereof are connected by transverse members 24 through which a rod 25 freely passes, the outer end of said rod being threaded and extended through an opening in the end 26 of said arm or frame 20 and provided with one or more nuts 27 by means of which said rod may be adjusted lengthwise of the frame 20 and bound in adjusted position. The inner end of the rod 25 has pivotally connected with it a double-ended lever 28, which while being pivotally mounted on the inner end of the rod 25 is otherwise rigid with said rod and may be adjusted toward or from the drum 14 on the adjustment of said rod 25 longitudinally of the frame or crank arm 20. The lever 28 has an upwardly extending arm or member 29 and a lower downwardly extending arm or member 30, and as may be seen in Fig. 2 the arm 30 is shorter than the arm 29. The lever 28 may be said to be a double-ended rocking lever, rocking in one direction when the crank arm or frame 20 is turned downwardly and in the other direction when said crank arm or frame is turned upwardly.

The double-armed lever 28 is pivotally connected at its ends with shoes 31 to which are secured the ends of the metal band 32 carrying on its inner face a lining 33 of suitable material for binding against the periphery of the drum 14. The lining 33 may be of leather but I preferably utilize raybestos or thermoid for such lining on account of the tendency of the materials named to closely bind against the drum and the ability of said materials to withstand considerable use without undue wear. The brake band comprises the parts 31, 32, 33, and is pivotally connected at its ends to the double-armed lever 28, the middle portions of said band being in constant engagement with the periphery of the stationary drum 14. The brake band may have an initial adjustment on the drum 14 by means of the rod 25 and nuts 27 whereby its force to be exerted on the drum may be regulated in accordance with conditions. The double-armed lever 28 is of special importance in that when the crank arm 20 is forced downwardly due to the depression of the body 10 when the wheel passes over an obstruction or enters a depression in the road, the longer arm of said lever turns inwardly and the shorter arm turns outwardly with relation to the drum 14, thereby relaxing the tension of the brake band on said drum, and that on the recoil of the automobile supporting springs and the upward movement of the body 10 and crank arm 20, the longer arm 29 of said lever 28 turns outwardly and the shorter arm 30 on said lever turns inwardly with relation to the drum 14 and act to bind the brake band with great firmness against the drum 14, said drum and band then serving to check the upward movement of the body 10 and relieve the same and supporting springs from strain and jar. By having the arms 29, 30 of the lever 28 of different lengths, I am enabled to so adjust my shock absorber that the vehicle body may descend without material resistance against the usual supporting springs but cannot ascend with sufficient suddenness to impair the comfort of the occupants of the car or with such violence as might result in breakage of the supporting springs. The brake band has, therefore, a differential action moving with considerable freedom when the crank arm is turned downwardly and with material retardation during the upward movement of said crank arm. The action of the brake band and lever 28 may be regulated to a considerable extent by the adjustment of the rod 25 toward and from the drum 14, the resistance of the band against the drum being increased by the adjustment of the rod 25 outwardly from the drum.

What I claim as my invention and desire to secure by Letters Patent, is:

1. In an automobile or other vehicle, in combination, a shock-absorber interposed between the axle and body thereof comprising a brake-drum, a brake-band thereon, a pivotally mounted two-armed lever connected at its ends with the ends of said band and one of the arms of said lever being longer than the other, and a crank-frame carrying said lever and adapted on the descent and ascent of said body to effect the rocking of said lever and a resultant differential binding of the band on said drum.

2. In an automobile or other vehicle, in combination, a shock-absorber interposed between the axle and body thereof comprising a brake-drum, a brake-band thereon, a pivotally mounted two-armed lever connected at its ends with the ends of said band and one of the arms of said lever being longer than the other, a crank-frame carrying said lever and adapted on the descent and ascent of said body to effect the rocking of said lever and a resultant differential binding of the band on said drum, and means carried by said frame for adjusting the relation of said lever and band to said drum.

3. In an automobile or other vehicle, in combination, a shock-absorber interposed between the axle and body thereof comprising a brake-drum, a brake-band thereon, a pivotally mounted two-armed lever connected at its ends with the ends of said band and one of the arms of said lever being longer than the other, and means adapted on the descent and ascent of said body to effect the rocking of said lever and a resultant differential binding of the band on said drum.

4. In an automobile or other vehicle, in combination, a shock-absorber interposed between the axle and body thereof comprising a brake-drum, a brake-band thereon, a pivotally mounted two-armed lever connected at its ends with the ends of said band and one of the arms of said lever being longer than the other, means adapted on the descent and ascent of said body to effect the rocking of said lever and a resultant differential binding of the band on said drum, and means for adjusting the relation of said lever and band to said drum.

5. In an automobile or other vehicle, in combination, a shock-absorber interposed between the axle and body thereof comprising a brake-drum, a brake-band thereon, a pivotally mounted two-armed lever connected at its ends with the ends of said band and one of the arms of said lever being longer than the other, a crank-frame carrying said lever and adapted on the descent and ascent of said body to effect the rocking of said lever and a resultant differential binding of the band on said drum, and means carried by said frame for adjusting the relation of said lever and band to said drum comprising a rod mounted in said frame on one end of which said lever is mounted and having a threaded end and nut to engage said frame.

Signed at New York city, in the county of New York and State of New York, this 17th day of June A. D. 1915.

WILLIAM BARDSLEY.

Witnesses:
 ARTHUR MARION,
 CHAS. C. GILL.